United States Patent [19]

Bonko et al.

[11] Patent Number: 4,711,283

[45] Date of Patent: Dec. 8, 1987

[54] HEAVY DUTY PNEUMATIC TIRE TREAD WITH LUG AND BLOCK PATTERN

[75] Inventors: Mark L. Bonko, Hartville; Loran C. Lopp, Jr., Wadsworth, both of Ohio

[73] Assignee: The Goodyear Tire & Rubber Company, Akron, Ohio

[21] Appl. No.: 8,690

[22] Filed: Jan. 30, 1987

[51] Int. Cl.$^4$ ............................................ B60C 11/11
[52] U.S. Cl. .................................................. 152/209 B
[58] Field of Search ........... 152/209 B, 209 R, 209 D; D12/136, 140, 147

[56] References Cited

U.S. PATENT DOCUMENTS

| | | | |
|---|---|---|---|
| 2,011,552 | 8/1935 | Hoover | 152/209 R |
| 2,113,066 | 4/1938 | Hoover | 152/209 R |
| 2,539,617 | 1/1951 | Gestwick | 152/209 R |
| 2,626,649 | 1/1953 | Eiler et al. | 152/209 B |
| 3,237,669 | 3/1966 | Travers | 152/209 R |
| 3,547,175 | 12/1970 | Verdier | 152/209 B |
| 3,844,326 | 10/1974 | Verdier | 152/209 B |
| 4,217,943 | 8/1980 | Tsurzua | 152/209 B |
| 4,383,567 | 5/1983 | Crum et al. | 152/209 B |
| 4,481,993 | 11/1984 | Ohnishi | 152/209 B |
| 4,574,857 | 3/1986 | Beeghly et al. | 152/209 B |

FOREIGN PATENT DOCUMENTS

| | | |
|---|---|---|
| 1009954 | 6/1957 | Fed. Rep. of Germany . |
| 3324706 | 12/1984 | Fed. Rep. of Germany . |
| 1330921 | 5/1963 | France . |
| 1368146 | 6/1964 | France . |
| 1548533 | 12/1968 | France . |
| 1569597 | 6/1969 | France . |
| 2375059 | 7/1978 | France . |
| 1591139 | 6/1981 | United Kingdom . |
| 2104851 | 3/1983 | United Kingdom . |

OTHER PUBLICATIONS

1980 Tread Design Guide, p. 211, Kelly-Springfield Grader-Trac, 2nd row down from top of page.
1982 Tread Design Guide, p. 205, Star Grader, bottom right corner of page.
Operating Instructions for Michelin Tires 1984/1985, p. 187, Michelin "XF" and Dumper tires, translation supplied.
Michelin Tires for Engineering Implements 1976-77, p. 22, Michelin "XF" tire, translation supplied.

*Primary Examiner*—Michael Ball
*Attorney, Agent, or Firm*—L. R. Drayer

[57] ABSTRACT

A radial ply pneumatic tire (10) for heavy construction equipment has a tread portion comprising two sets of traction lugs (15, 16) and a series of block elements (17). Preferably, the tread arc radius of the tire is in the range of 90% to 110% of the maximum cross-sectional width of the tire.

20 Claims, 8 Drawing Figures

HEAVY DUTY PNEUMATIC TIRE TREAD WITH LUG AND BLOCK PATTERN

This invention relates generally to pneumatic tires, and in particular, to pneumatic tires intended for use on the drive axles of heavy duty construction equipment. Tires of this general type are described for example in U.S. Pat. No. 3,237,669.

Construction equipment such as backhoes and front-end loaders are commonly driven over highways to construction sites where the same equipment will be operated on unpaved surfaces. Therefore, it is desirable that the tires used on such equipment provide good ride and handling when the equipment is operated on a paved surface, as well as good traction when the equipment is operated at a construction site. In those instances where the equipment is operated on a landscaped job site, it is further desirable that the tires inflict a minimum amount of damage to the landscaped surface. There is provided in accordance with the present invention a radial ply pneumatic tire which provides all of these desirable characteristics.

There is provided in accordance with one aspect of the invention a pneumatic tire comprising a radial ply carcass and a belt structure extending circumferentially about the axis of rotation of the tire, a tread portion extending circumferentially around said carcass and said belt structure. The tread portion of the tire comprises two sets of traction lugs, each lug of said first set of traction lugs extending from a first lateral edge of the tread towards the mid-circumferential plane of the tire at a general inclination in the range of 45° to 60° with respect to the mid-circumferential plane of the tire to an axially inner end located an axial distance of 35% to 45% of the tread width from said first lateral edge of the tread. Each lug of the second set of traction lugs is similar to the lugs of the first set of traction lugs but opposite in hand and extending from a second lateral edge of the tread, each lug of the second set being offset circumferentially of the tire with respect to the next adjacent pair of lugs of the first set of traction lugs. A plurality of block elements are disposed in a central portion of the tread, each of said traction lugs having a single block element circumferentially aligned with an edge or edges of the traction lug connecting a leading and trailing edge of the traction lug at the axially inner end of the traction lug. Each block element is oriented at an angle in the range of 45° to 60° with respect to the mid-circumferential plane of the tire. Between 80% to 90% of the axial extent of each block element is disposed on the opposite side of the mid-circumferential plane from the circumferentially aligned traction lug, and each block element has a radially outer surface which communicates with a base portion of the tread by means of a wall or walls. The radially measured height of the wall or walls varies by not more than 25% around the periphery of the block elements.

There is provided in accordance with another aspect of the invention a pneumatic tire comprising a radial ply carcass and a belt structure extending circumferentially about the axis of rotation of the tire, a tread portion extending circumferentially around said carcass and belt structure. The tread portion comprises two sets of traction lugs, each lug of the first set of traction lugs extending from a first lateral edge of the tread towards the mid-circumferential plane of the tire at a general inclination in the range of 45° to 60° with respect to the mid-circumferential plane of the tire to an axially inner end located an axial distance of 35% to 45% of the tread width from said first lateral edge of the tread. Each lug of the second set of traction lugs is similar to the lugs of the first set of traction lugs, but opposite in hand and extending from a second lateral edge of the tread. Each lug of the second set is offset circumferentially of the tire with respect to the next adjacent pair of lugs of the first set of traction lugs. A central zone of the tread is disposed on both sides of the mid-circumferential plane of the tire. The central zone has a total width in the range of 35% to 45% of the tread width. A plurality of block elements are disposed in the central zone, each of said block elements having a total axial extent in the range of 17% to 27% of the tread width and a total circumferential extent in the range of 15% to 25% of the tread width. Each block element is spaced apart a distance of at least 5% of the tread width from each of the nearest traction lugs and each of the nearest block elements. Between 80% to 90% of the axial extent of each block element is disposed on one side of the mid-circumferential plane and the remainder of its axial extent is disposed on the other side of the mid-circumferential plane. Each of the traction lugs has a single block element circumferentially aligned with an edge or edges of the traction lug connecting a leading edge and a trailing edge of the traction lug at the axially inner end of the traction lug. Each block element has a radially outer surface which communicates with a base portion of the tread by means of a wall or walls, the radially measured height of said wall or walls varying by not more than 25% around the periphery of the block elements.

There is provided in accordance with yet another aspect of the invention a pneumatic tire comprising a radial ply carcass and a belt structure extending circumferentially about the axis of rotation of the tire. The tread arc radius of the tire is in the range of 90% to 110% of the maximum cross-sectional width of the tire. The tread portion comprises two sets of traction lugs, each lug of the first set of traction lugs having first and second portions, the first portion extending from a first lateral edge of the tread to an axially inner end located an axial distance in the range of 15% to 25% of the tread width from said first lateral edge of the tread at an angle in the range of 60° to 75° with respect to the mid-circumferential plane of the tire. The second portion extends from the axially inner end of the first portion to an axially inner end located an axial distance in the range of 35% to 45% of the tread width from said first lateral edge of the tread at an angle in the range of 43° to 53° with respect to the mid-circumferential plane. Each traction lug has leading and trailing edges, the leading and trailing edges of the second portion of a traction lug being connected to one another by a connecting edge or edges at the axially inner end of the traction lug. Each lug of the second set of traction lugs is similar to the lugs of the first set of traction lugs, but opposite in hand and extending from a second lateral edge of the tread, each lug of the second set being offset circumferentially of the tire with respect to the next adjacent pair of lugs of the first set of traction lugs. The tread further comprises a plurality of block elements, said block elements being disposed such that one, and only one, block element is circumferentially aligned with the connecting edge or edges of the second portion of each traction lug. The block elements each have a total axial extent in the range of 17% to 27% of the tread width and a total circumferential extent in the range of 15% to 25% of the tread width. Each block element is spaced apart a distance in the range of 5% to 11% of the tread width from each of the nearest traction lugs and each of the nearest block elements. Only 10% to 20% of the axial extent of a block element is disposed on the same side of the mid-circumferential plane as the traction lug having the connecting edge or edges with which the block element is circumferentially aligned. Each block element has a radially outer surface which communicates with a base portion of the tread by means of a wall or walls, the radially measured height of said wall or walls varying by not more than 25% around the periphery of the block elements.

The features of the present invention which are believed to be novel are set forth with particularity in the appended claims. The present invention, both as to its structure and manner of operation, may best be understood by referring to the following detailed description, taken in accordance with the accompanying drawings in which:

Figure 1:
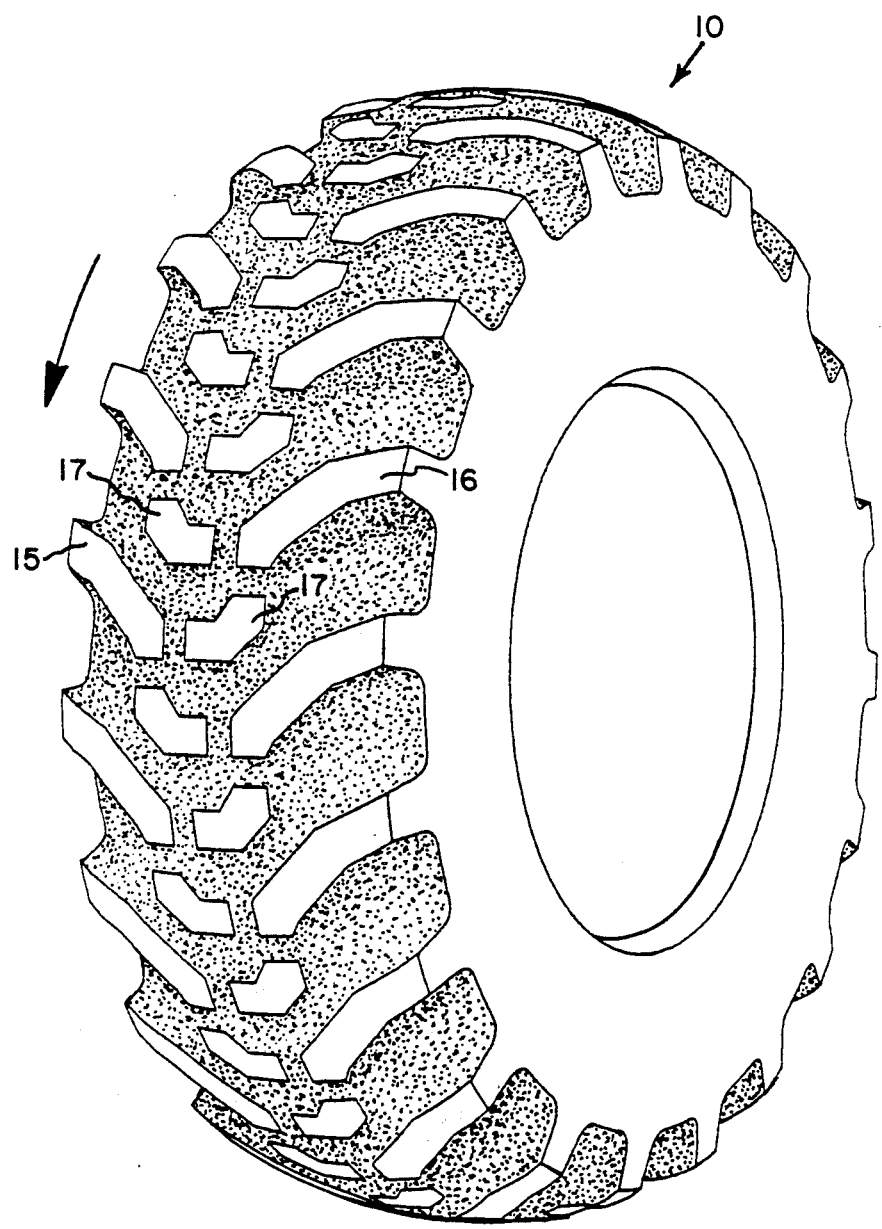
FIG. 1 is a perspective view of a tire in accordance with the preferred embodiment of the invention.

Referring first to FIG. 1, there is shown a perspective view of a pneumatic tire 10 in accordance with the preferred embodiment of the invention. Tires of the type disclosed herein are most advantageously employed on the drive axle positions of excavating and construction equipment such as front-end loaders and backhoes. This type of machinery requires relatively large tires on its drive axle(s), that is to say, tires having nominal bead diameters of 24 inches (61 cm) or larger. However, it is understood that tires according to the invention may have smaller bead diameters and may be employed on other types of vehicles, such as farm tractors or trucks that would be operated both on and off the highway.

Figure 2:
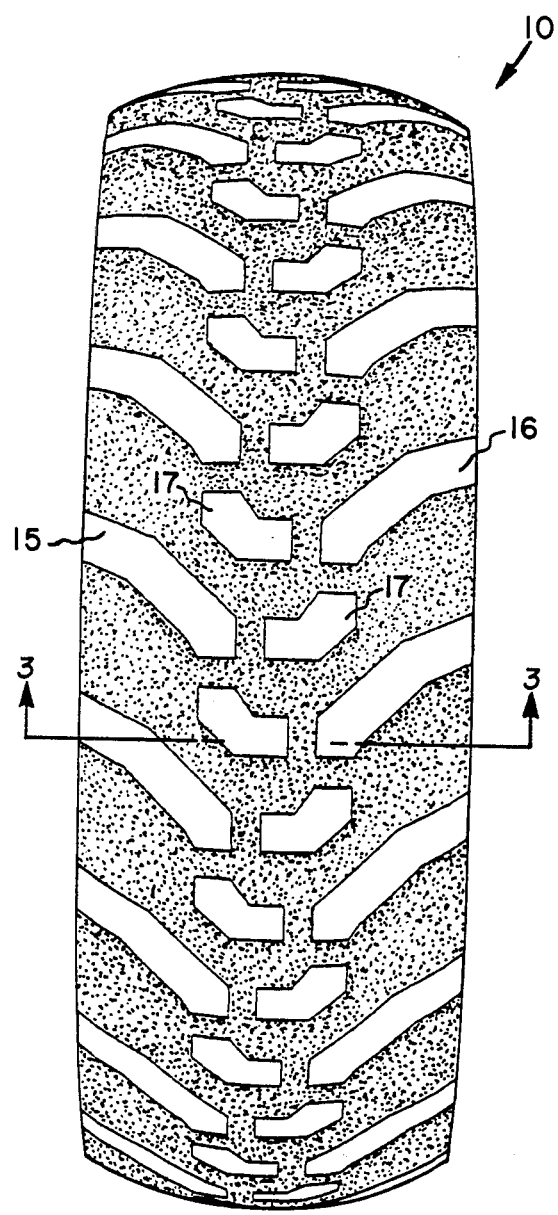
FIG. 2 is a front elevation view of the tire shown in FIG. 1.
Figure 3:
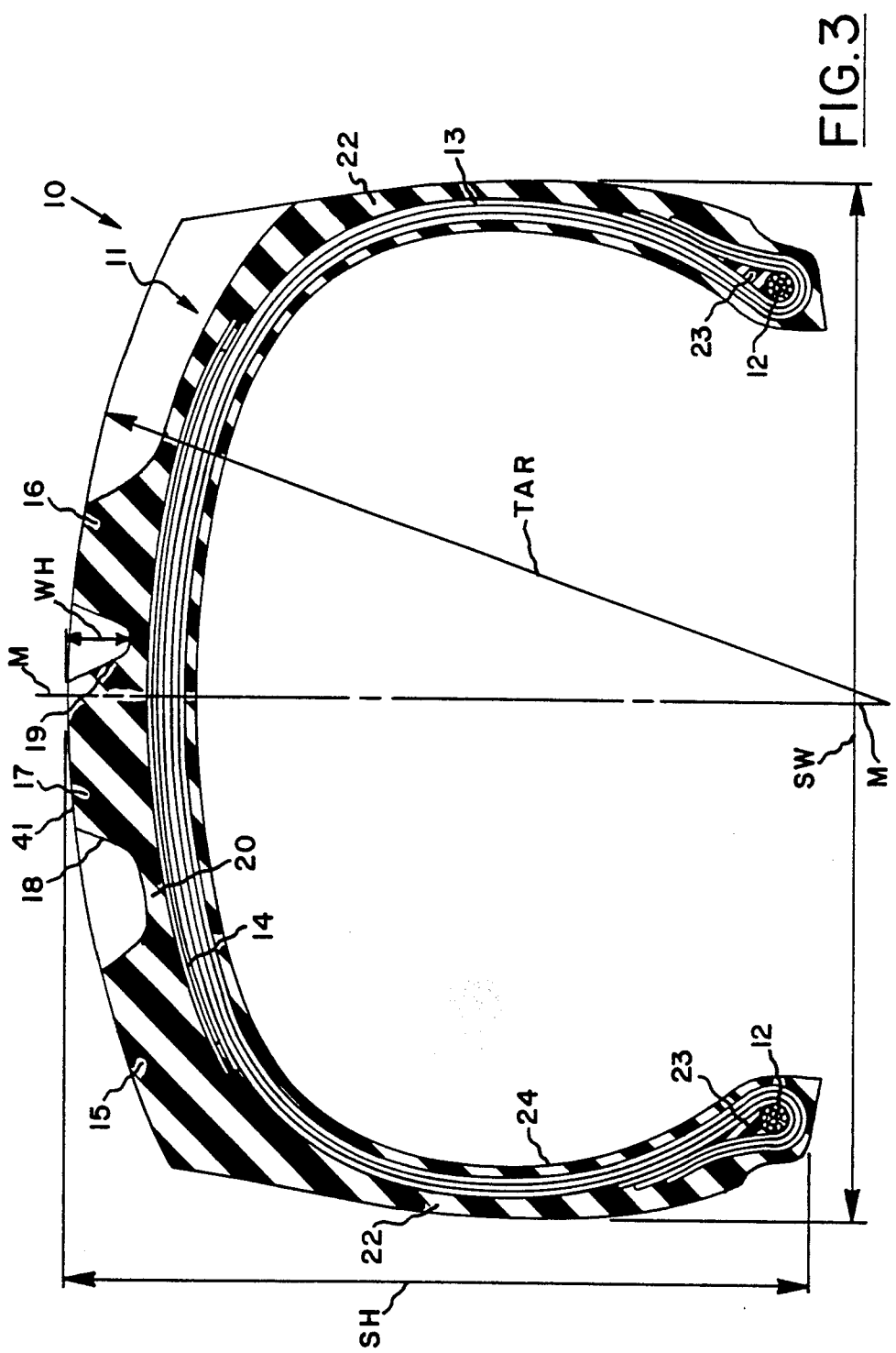
FIG. 3 is a radial cross-sectional view of the tire shown in FIG. 1, taken substantially along line 3—3 of FIG. 2.

Referring next to FIG. 3, there is shown a radial cross-sectional view of a tire 10 according to the invention taken along line 3—3 of FIG. 2. The tire has a radial ply carcass which comprises one or more carcass plies 13 which extend circumferentially about the axis of rotation of the tire and are anchored around a pair of substantially inextensible annular beads 12. That is to say, as used herein and in the claims, a "radial ply carcass" is understood to mean the carcass ply or plies and annular beads of a tire wherein the reinforcing cords of the carcass ply or plies are oriented at angles in the range of 75° to 90° with respect to the mid-circumferential plane M-M of the tire. Tires have been manufactured according to the invention using three carcass plies, each of which was reinforced with polyester cords having a construction of 1000/2 with about eight cords per cm: however, it is within the scope of the invention to use any other type of suitable cords in the carcass ply, such as steel. A belt structure 14 is disposed radially outwardly of the radial ply carcass and extends circumferentially thereabout. Tires have been manufactured according to the invention using three belt plies which were reinforced with 1650/3 rayon; however, it is understood that other suitable materials may be used for reinforcing the belt plies. While tires according to the invention have been manufactured using unfolded belt plies, it is understood that folded belt plies or a combination of folded and unfolded belt plies may be employed in the practice of the invention. As used herein, "radial" and "radially" refer to directions perpendicular to the axis of rotation of a tire, and "axial" and "axially" refer to directions parallel to the axis of rotation of a tire. Furthermore, as used herein a "mid-circumferential plane" is a plane which is perpendicular to the axis of rotation of a tire, and is located midway between the lateral edges of the tread in the footprint of a tire that has been mounted on its designated rim, then inflated to its designed inflation pressure and subjected to its rated load for that inflation pressure. As used herein "axially inwardly" is understood to mean a direction going from a lateral edge of the tread towards the mid-circumferential plane and "axially outwardly" is understood to mean a direction going from the mid-circumferential plane towards a lateral edge of the tread.

The designated rim, inflation pressure, and load for a tire of a given size and load range (ply rating) may be determined by referring to the yearbook of The Tire and Rim Association, Incorporated or the yearbook of the European Tire & Rim Technical Organization, published in the year that the tire is manufactured.

A tread portion 11 extends circumferentially around the radial ply carcass and belt structure and is disposed radially outwardly thereof. A tire according to the invention has an aspect ratio of not greater than 0.85, and preferably in the range of 0.65 to 0.75. The aspect ratio of a tire is the ratio of the section height SH to the maximum cross-sectional width SW. The section height SH is the radially measured distance from the nominal bead diameter of the tire to the radially outermost point on the outer surface of the tire tread when the tire is mounted upon its designated rim and inflated to its specified inflation pressure but not subjected to any load. The maximum cross-sectional width SW is the axially measured distance between the outer surfaces of the sidewalls 22 of the tire at the widest point of the tire when the tire is mounted upon its designated rim and inflated to its specified inflation pressure but not subjected to any load. A tire according to the invention has a tread arc radius TAR in the range of 90% to 110% of the maximum cross-sectional width SW of the tire. As used herein, the tread arc radius of a tire is the radius of an arc having its center located on the mid-circumferential plane M—M and which substantially coincides with the radially outermost surfaces of the various traction elements (lugs, blocks, buttons, ribs, etc.) across the lateral width of the tread portion of a tire when the tire is mounted upon its designated rim and inflated to its specified inflation pressure but not subjected to any load. The relationship between the maximum cross-sectional width and the tread arc width of a tire according to the invention is believed to be important because it contributes to the high flotation characteristics of the tire. Flotation characteristics are understood to refer to the low unit tread pressure (kilograms per square cm of pressure) exerted upon a supporting surface by the tire as it rolls along that surface.

A tire according to the invention preferably has a low permeability innerliner 24, but it is understood that this invention may apply to tube-type tires as well as tubeless tires. Other well known tire components, such as apexes Z3, flippers, chippers, and chafers, may be used in the manufacture of a tire according to the invention as so desired by a tire designer skilled in the practice of the tire art.

The tread portion 11 of the tire comprises two sets of traction lugs 15,16 and a plurality of block elements 17. The tread portion can best be described with reference to FIG. 4, which is an enlarged plan view of a tire according to the preferred embodiment. The particular tire illustrated is of a size 17.5LR24, which means a tire having a section width SW of 17.5 inches (44.5 cm) and a nominal bead diameter of 24 inches (61 cm) and a low profile (that is to say, an aspect ratio of 72 or below, in this instance 70.4). In the tire illustrated, the maximum cross-sectional width is about 17.2 inches (44 cm) and the tread arc radius is about 17.6 inches (45 cm), or put another way, the tread arc width is about 103% of the maximum cross-sectional width. Each lug 15 of the first set of traction lugs extends from a first lateral edge $TE_1$ of the tread towards the mid-circumferential plane M—M of the tire at a general inclination $\alpha$ in the range of 45° to 60° with respect to the mid-circumferential plane of the tire to an axially inner end 27 located an axial distance of 35% to 45% of the tread width TW from said first lateral edge of the tread. As used herein, the tread width TW is understood to mean the largest axial distance across the footprint of a tire when the tire is mounted on its designated rim, inflated to its specified inflation pressure, and subjected to its rated load for that inflation pressure. The general inclination $\alpha$ of a traction lug, and all other measurements relating to the traction lugs and block elements of a tire according to this invention as stated herein and in the claims are understood to refer to measurements made from a footprint of a tire when the tire has been mounted upon its designated rim, inflated to its specified inflation pressure and subject to its rated load for that inflation pressure.

Figure 4:
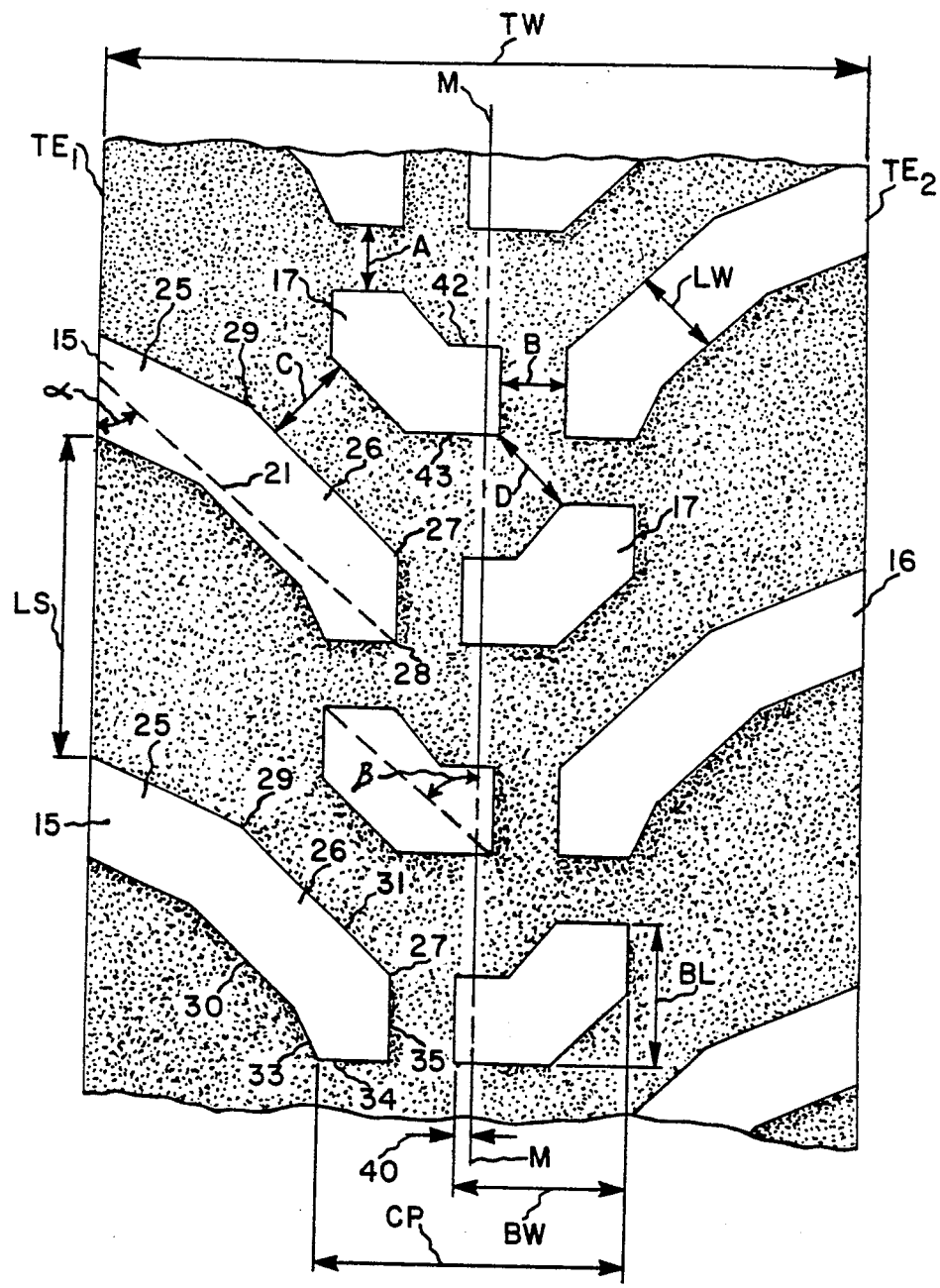
FIG. 4 is an enlarged plan view of a portion of the tread of the tire shown in FIG. 1 and FIGS. 5-8 are plan views of the treads of tires according to alternative embodiments of the invention.

The angle $\alpha$ of general inclination of a traction lug is determined by establishing a line 21 connecting the midpoint of the length of the axially outermost edge of the traction lug (which preferably is at the tread edge) with the axially innermost point 28 of the leading edge of the traction lug, as illustrated in FIG. 4, and then measuring the inclination of this line 21 with respect to the mid-circumferential plane M—M or a line parallel thereto. A tire according to the invention is a "directional type tire", which means that it is designed to operate most efficiently when rotated in a particular direction, more particularly the direction indicated by the arrow in FIG. 1. For the purpose of describing and claiming this invention, "leading" is understood to mean a portion or part of the tread that contacts the ground first, with respect to a series of such parts or portions, during rotation of the tire in the preferred direction: and "trailing" is understood to mean that portion or part of the tread that contacts the ground last, with respect to a series of such parts or portions.

Figure 5:
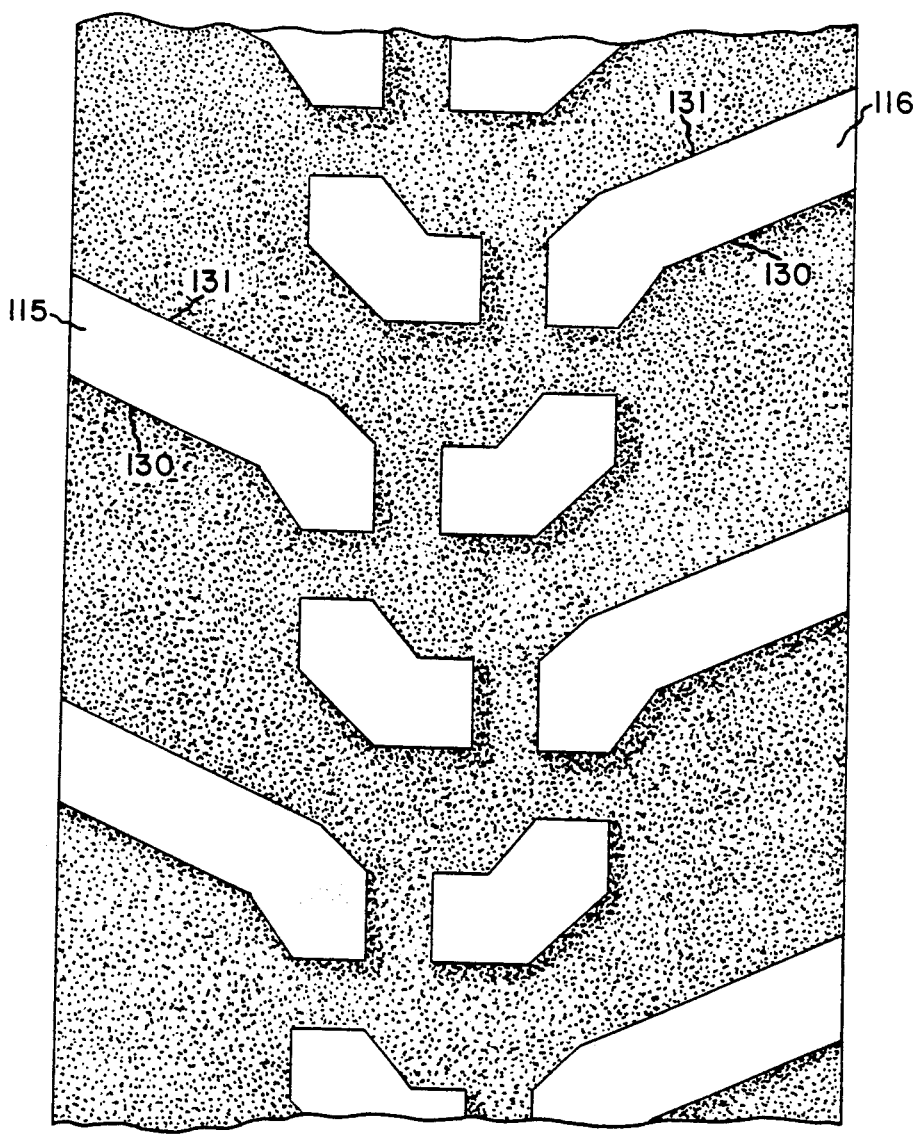
Figure 6:
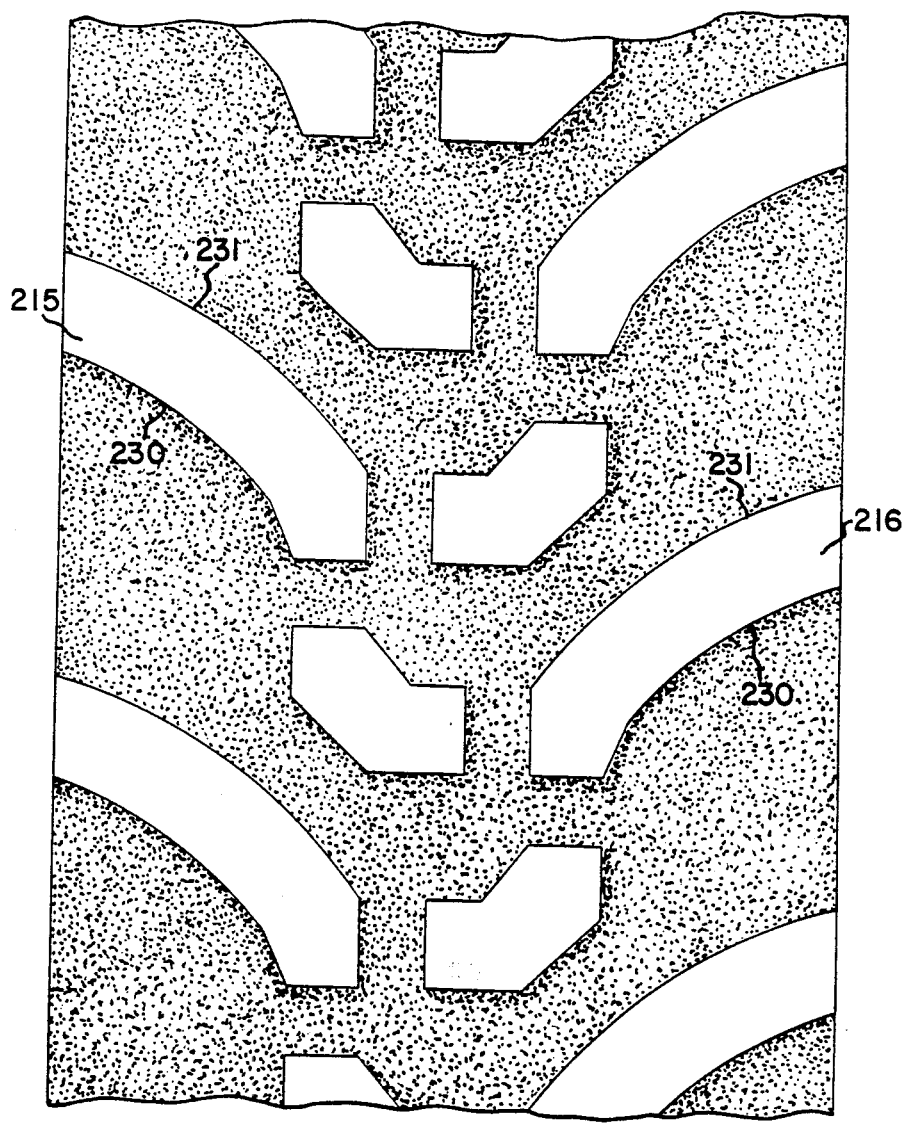

In the preferred embodiment of the invention, each lug 15 of the first set of traction lugs has first and second portions 25 and 26. The first portion 25 extends from the first lateral edge $TE_1$ of the tread to an axially inner end 29 which is located an axial distance in the range of 15% to 25% of the tread width TW from said first lateral edge of the tread at an angle in the range of 60° to 70° with respect to the mid-circumferential plane of the tire. The second portion 26 of each traction lug extends from the axially inner end 29 of the first portion to an axially inner end 27 located an axial distance in the range of 35% to 45% of the tread width from said first lateral edge of the tread at an angle in the range of 43° to 53° with respect to the mid-circumferential plane. Each traction lug has leading and trailing edges 30,31 with the leading and trailing edges of the second portion 26 of each traction lug being connected to one another by a connecting edge, or edges, 33,34,35 at the axially inner end of the traction lug. It should be noted that one or more of the connecting edges, such as edges 33 and 34 in FIG. 4, may in fact form a part of the leading edge of the traction lug. The connecting edge, or edges, may be either straight or curved, may enlarge the ground engaging area of the traction lug at its axially inner end, or may simply connect the leading and trailing edges of the second portion of the traction lug with a straight line. Each lug 16 of the second set of traction lugs is similar to the lugs 15 of the first set of traction lugs, but opposite in hand, and extends from a second lateral edge $TE_2$ of the tread. Each lug of the second set is offset circumferentially of the tire with respect to the next adjacent pair of lugs of the first set of traction lugs. While it is preferred that the leading and trailing edges of the traction lugs are a series of straight line segments placed end to end in angular relationships thereby yielding a lug with various portions as shown in FIG. 4, it is understood to be within the scope of the invention to have the leading edges 130 and the trailing edges 131 of traction lugs 115 and 116 comprise only a single straight edge as illustrated in FIG. 5, and even to have the leading edges 230 and the trailing edges 231 of the traction lugs 215,216 be curved as illustrated in FIG. 6.

The circumferential spacing between the leading edge of one traction lug and the trailing edge of the next adjacent traction lug of the same set, as indicated by LS in FIG. 4, is preferably in the range of 35% to 45% of the tread width TW. The width of each traction lug measured perpendicular to the leading and trailing edges of the traction lug, as illustrated at LW in FIG. 4, is preferably in the range of 8% to 13% of the tread width TW. The spacing between the traction lugs is important because it must be wide enough to accommodate the ejection of loose soil and mud from the tread, but not so great that a rough ride or poor traction results. The width of each traction lug is important because if it is too small the traction lug may be damaged when the tire rolls over rocks, curbs, and so forth, but not so large that the lugs will be too stiff and cause excessive turf damage and a rough ride.

Figure 7:
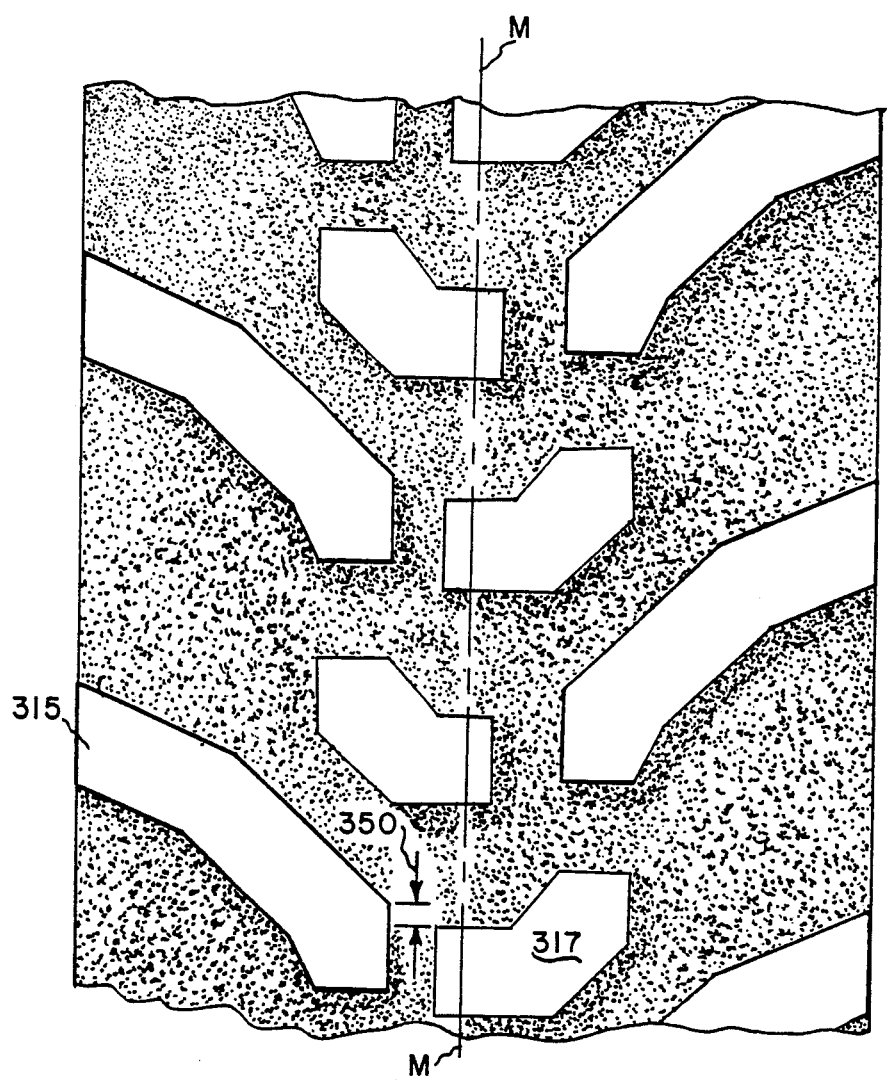

A plurality of block elements 17 are disposed in a central portion CP of the tread. The axial width of the central portion CP of the tread is in the range of 35% to 45% of the tread width TW. Each of the traction lugs 15,16 has a single block element 17 circumferentially aligned with an edge or edges 33,34,35 which connects the leading 30 and trailing 31 edges of the traction lug at the axially inner end of the traction lug. Preferably, the block elements are disposed such that any plane which has the axis of rotation of the tire as one of its edges intersects not more than one of the block elements. Preferably one, and only one, block element is circumferentially aligned with a connecting edge of the second portion of each traction lug. As used herein, "circumferentially aligned" is understood to mean that there is at least one plane which contains the axis of rotation of the tire and intersects both a block element and an edge connecting the leading and trailing edges of a traction lug. While it is preferred that the edge of a block element which is nearest to and parallel with a connecting edge of a traction lug is exactly circumferentially aligned therewith as illustrated in FIG. 4, it is understood that the nearest edges of a block element 317 and a traction lug 315 may be slightly offset circumferentially with respect to one another as indicated by 350 in FIG. 7 without deviating from the scope of this invention.

Figure 8:
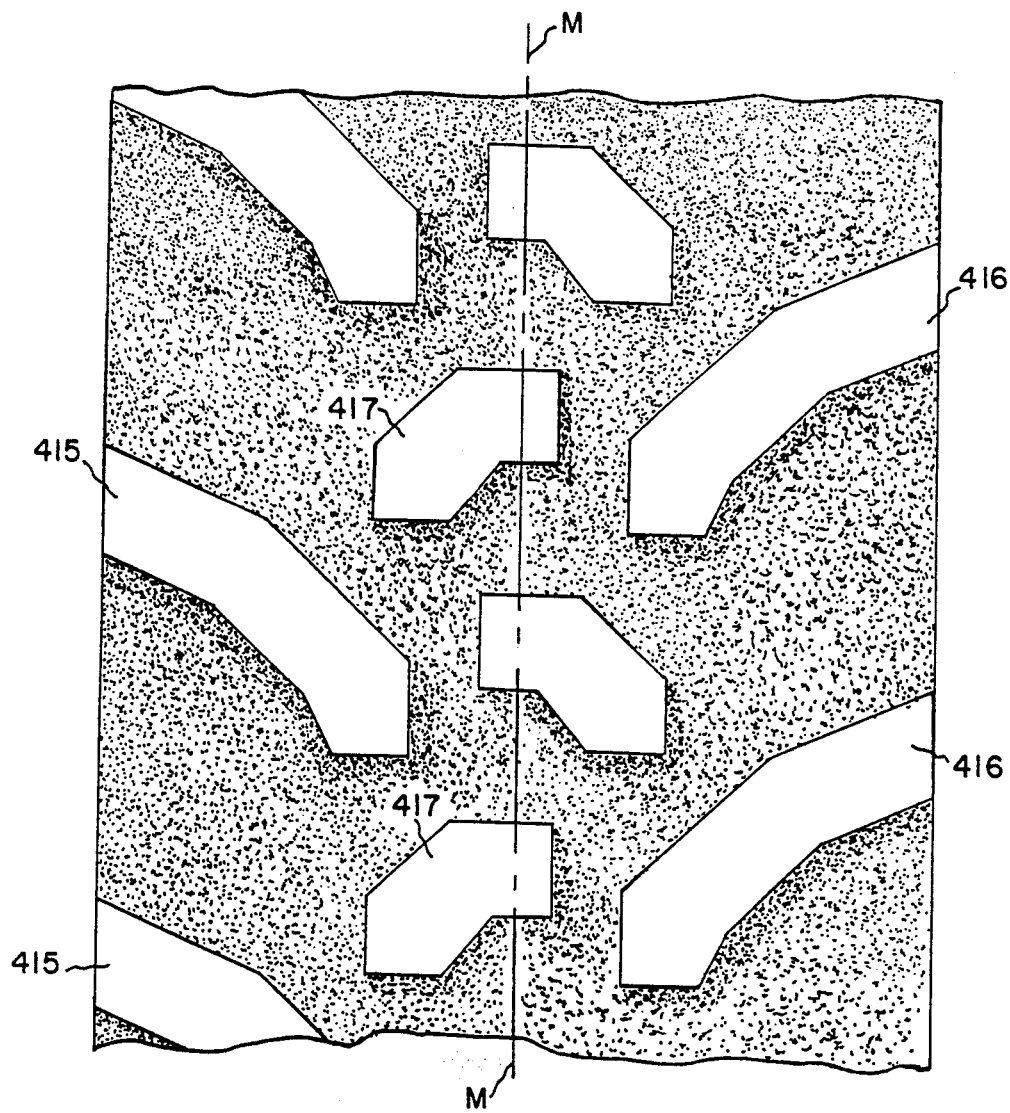

Each of the block elements 17 has a total axial extent BW in the range of 17% to 27% of the tread width TW and a total circumferential extent BL in the range of 15% to 25% of the tread width TW. Preferably, only 10% to 20% of the axial extent of a block element is disposed on the same side of the mid-circumferential plane M—M as the traction lug having the connecting edge with which the block element is circumferentially aligned (as shown at 40 in FIG. 4) or, in other words, between 80% to 90% of the axial extent of each block element is disposed on the opposite side of the mid-circumferential plane from the traction lug with which it is associated. Each block element is oriented at an angle $\beta$ in the range of 45° to 60° with respect to the mid-circumferential plane of the tire, and the angle $\beta$ is opposite in sign to the orientation of the traction lug with whose connecting edge the block element is circumferentially aligned. Put another way, a block element is preferably oriented opposite in hand to the orientation of the associated traction lug. Put yet another way, it is preferred that the orientation of a block element with respect to the mid-circumferential plane is opposite to that of the circumferentially adjacent block elements. However, as illustrated in FIG. 8, it is within the scope of the invention to have the block elements 417 oriented in the same manner with respect to the mid-circumferential plane M—M as the traction lugs 415,416, but this embodiment requires care in the spacing of the lugs and block elements with respect to one another to insure that mud and loose soil can be efficiently ejected from the tread during use. Each block element 17 is spaced apart a distance A,B,C,D of at least 5%, and preferably in the range of 5% to 11%, of the tread width TW from each of the nearest traction lugs 15,16 and each of the nearest block elements 17. As best illustrated in FIG. 3, each block element 17 has a radially outer surface 41 which communicates with a base portion 20 of the tread by means of a wall or walls 18,19. It is understood that said wall or walls extend completely around the periphery of the block element. The radially measured height WH of said wall or walls 18,19 does not vary by more than 25% around the periphery of a block element. This spacing between the block elements and the substantially constant height of the walls of the block elements is important because it allows the evacuation of dirt and mud from the tread and further allows a block element to move independently of the traction lugs when the tire is operated on rough surfaces. Preferably, the leading and trailing edges 42,43 of a block element that intersect the mid-circumferential plane M—M are oriented substantially perpendicular to the mid-circumferential plane. This feature, while preferable, is not necessary to the invention but is believed to contribute to the low amount of turf damage inflicted at construction sites by tires according to the invention. It is understood that the exact shape of the block elements may be varied by a tire designer, but it is preferred that the radially outer surface of each block element be a polygonal shape with straight sides.

While certain representative embodiments and details have been shown and described for the purpose of illustrating the invention, it will be apparent to those skilled in the art that various changes and modifications may be made therein without departing from the spirit or scope of the invention.

We claim:

1. A pneumatic tire comprising a radial ply carcass and a belt structure extending circumferentially about the axis of rotation of the tire, a tread portion extending circumferentially around said carcass and belt structure, and said tread portion comprising:
   (a) two sets of traction lugs, each lug of said first set of traction lugs extending from a first lateral edge of the tread towards the mid-circumferential plane of the tire at a general inclination in the range of 45° to 60° with respect to the mid-circumferential plane of the tire to an axially inner end located an axial distance of 35% to 45% of the tread width from said first lateral edge of the tread, and each lug of said second set of traction lugs being similar to the lugs of the first set of traction lugs but opposite in hand and extending from a second lateral edge of the tread, each lug of said second set being offset circumferentially of said tire with respect to the next adjacent pair of lugs of the first set of traction lugs; and
   (b) a plurality of block elements disposed in a central portion of the tread, each of said traction lugs having a single block element circumferentially aligned with an edge or edges of the traction lug connecting a leading and a trailing edge of the traction lug at the axially inner end of the traction lug, each block element being oriented at an angle in the range of 45° to 60° with respect to the mid-circumferential plane of the tire, between 80% to 90% of the axial extent of each block element being disposed on the opposite side of the mid-circumferential plane from said circumferentially aligned traction lug, and each block element having a radially outer surface which communicates with a base portion of the tread by means of a wall or walls, the radially measured height of said wall or walls varying by not more than 25% around the periphery of said block element.

2. A pneumatic tire as described in claim 1 wherein the leading and trailing edges of said traction lugs are curved.

3. A pneumatic tire as described in claim 1 wherein the leading and trailing edges of said traction lugs are straight.

4. A pneumatic tire as described in claim 1 wherein the leading and trailing edges of said traction lugs are a series of straight line segments placed end to end in angular relationships.

5. A pneumatic tire as described in any one of claims 1 to 4 wherein said tire has a tread arc radius that is in the range of 90% to 110% of the maximum cross-sectional width of the tire.

6. A pneumatic tire as described in any one of claims 1 to 4 wherein each block element is spaced apart a distance of at least 5% of the tread width from the nearest traction lugs and the nearest of the other block elements.

7. A pneumatic tire as described in claim 6 wherein each block element is oriented opposite in hand to the orientation of the traction lug with which it is circumferentially aligned.

8. A pneumatic tire comprising a radial ply carcass and a belt structure extending circumferentially about the axis of rotation of the tire, a tread portion extending circumferentially around said carcass and belt structure, and said tread portion comprising:

(a) two sets of traction lugs, each lug of said first set of traction lugs extending from a first lateral edge of the tread towards the mid-circumferential plane of the tire at a general inclination in the range of 45° to 60° with respect to the mid-circumferential plane of the tire to an axially inner end located an axial distance of 35% to 45% of the tread width from said first lateral edge of the tread, and each lug of said second set of traction lugs being similar to the lugs of the first set of traction lugs but opposite in hand and extending from a second lateral edge of the tread, each lug of said second set being offset circumferentially of said tire with respect to the next adjacent pair of lugs of the first set of traction lugs; and (b) a central zone of the tread disposed on both sides of the mid-circumferential plane of the tire, said central zone having a total width in the range of 35% to 45% of the tread width, a plurality of block elements being disposed in said central zone, each of said block elements having a total axial extent in the range of 17% to 27% of the tread width and a total circumferential extent in the range of 15% to 25% of the tread width, each block element being spaced apart a distance of at least 5% of the tread width from each of the nearest traction lugs and each of the nearest block elements, between 80% to 90% of the axial extent of each block element being disposed on one side of the mid-circumferential plane and the remainder of its axial extent being disposed on the other side of the mid-circumferential plane, each of said traction lugs having a single block element circumferentially aligned with an edge or edges connecting a leading and a trailing edge of the traction lug at the axially inner end of the traction lug, and each block element having a radially outer surface which communicates with a base portion of the tread by means of a wall or walls, the radially measured height of said wall or walls varying by not more than 25% around the periphery of said block element.

9. A pneumatic tire as described in claim 8 wherein the leading and trailing edges of said traction lugs are curved.

10. A pneumatic tire as described in claim 8 wherein the leading and trailing edges of said traction lugs are straight.

11. A pneumatic tire as described in claim 8 wherein the leading and trailing edges of said traction lugs are a series of straight line segments placed end to end in angular relationships.

12. A pneumatic tire as described in any one of claims 8 to 11 wherein said tire has a tread arc radius that is in the range of 90% to 110% of the maximum cross-sectional width of the tire.

13. A pneumatic tire as described in any one of claims 8 to 11 wherein the block elements have radially outer surfaces of polygonal shapes with straight edges.

14. A pneumatic tire as described in any one of claims 8 to 11 wherein the block elements each are oriented at angles in the range of 45° to 55° with respect to the mid-circumferential plane of the tire.

15. A pneumatic tire as described in claim 13 wherein the block elements each are oriented at angles in the range of 45° to 55° with respect to the mid-circumferential plane of the tire.

16. A pneumatic tire comprising a radial ply carcass and a belt structure extending circumferentially about the axis of rotation of the tire, said tire having a tread arc radius that is in the range of 90% to 110% of the maximum cross-sectional width of the tire, and said tread portion comprising:

(a) two sets of traction lugs, each lug of said first set of traction lugs having first and second portions, said first portion extending from a first lateral edge of the tread to an axially inner end located an axial distance in the range of 15% to 25% of the tread width from said first lateral edge of the tread at an angle in the range of 60° to 70° with respect to the mid-circumferential plane of the tire, said second portion extending from the axially inner end of said first portion to an axially inner end located an axial distance in the range of 35% to 45% of the tread width from said first lateral edge of the tread at an angle in the range of 43° to 53° with respect to said mid-circumferential plane, each traction lug having leading and trailing edges, the leading and trailing edges of the second portion of a traction lug being connected to one another by a connecting edge or edges at the axially inner end of the traction lug, and each lug of said second set of traction lugs being similar to the lugs of the first set of traction lugs but opposite in hand and extending from a second lateral edge of the tread, each lug of said second set being offset circumferentially of said tire with respect to the next adjacent pair of lugs of the first set of traction lugs: and (b) a plurality of block elements, said block elements being disposed such that one, and only one, block element is circumferentially aligned with a connecting edge of the second portion of each traction lug, said block elements each having a total axial extent in the range of 17% to 27% of the tread width and a total circumferential extent in the range of 15% to 25% of the tread width, each block element being spaced apart a distance in the range of 5% to 11% of the tread width from each of the nearest traction lugs and each of the nearest block elements, only 10% to 20% of the axial extent of a block element being disposed on the same side of the mid-circumferential plane as the traction lug having the connecting edge with which the block element is circumferentially aligned, and each block element having a radially outer surface which communicates with a base portion of the tread by means of a wall or walls, the radially measured height of said wall or walls varying by not more than 25% around the periphery of said block elements.

17. A pneumatic tire as described in claim 16 wherein the number of block elements is equal to the number of traction lugs.

18. A pneumatic tire as described in claim 16 wherein the block elements have radially outer surfaces of polygonal shapes with straight edges.

19. A pneumatic tire as described in claim 17 wherein the block elements have radially outer surfaces of polygonal shapes with straight edges.

20. A pneumatic tire as described in any one of claims 16 to 19 wherein the block elements each are oriented at angles in the range of 45° to 55° with respect to the mid-circumferential plane of the tire.

* * * * *